Dec. 3, 1946.  G. A. LYON  2,411,928
WHEEL STRUCTURE
Filed March 22, 1943  2 Sheets-Sheet 1
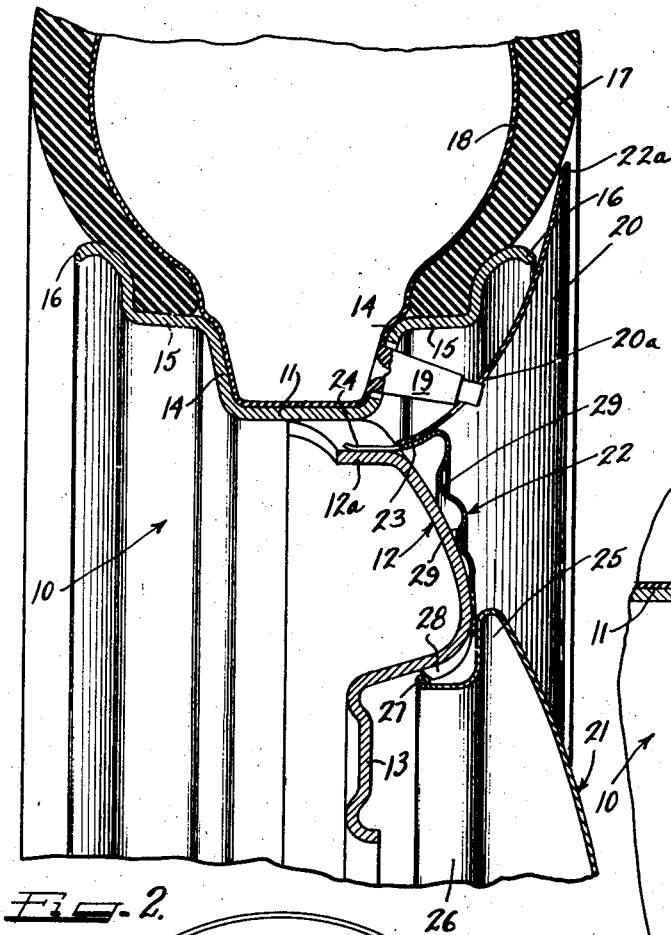
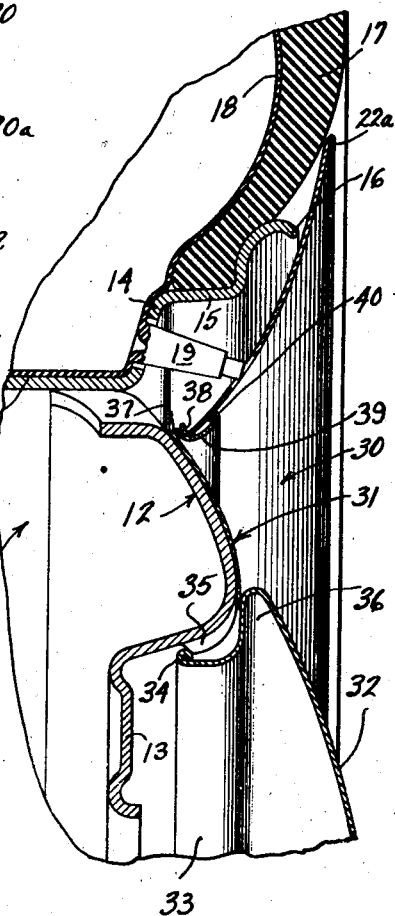
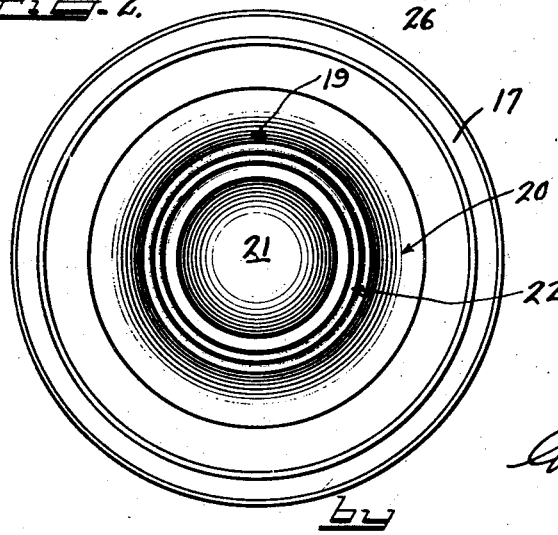
Inventor
George Albert Lyon.
Charles W. Hills
by
Attys.

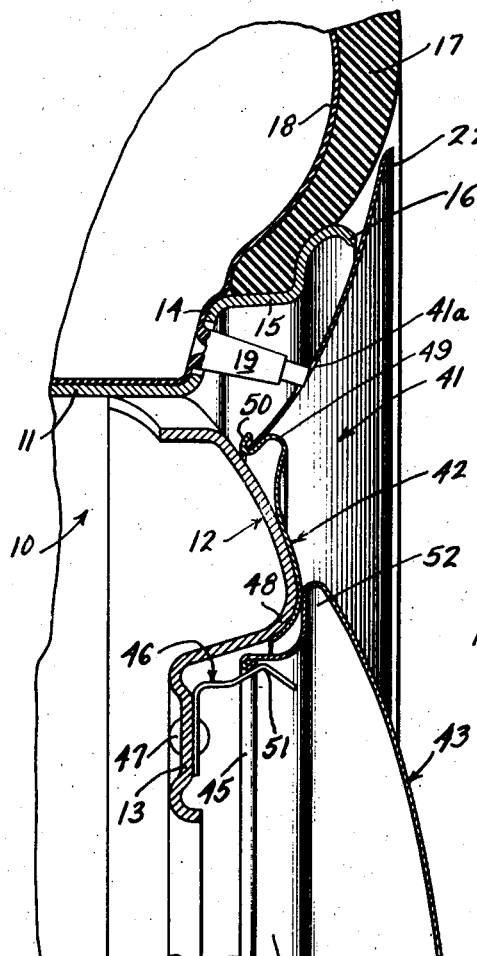

Patented Dec. 3, 1946

2,411,928

UNITED STATES PATENT OFFICE 2,411,928

WHEEL STRUCTURE

George Albert Lyon, Allenhurst, N. J.

Application March 22, 1943, Serial No. 479,981

2 Claims. (Cl. 301—37)

This invention relates to an improved wheel structure and is directed more particularly to an improved cover assembly therefor.

One of the principal objects of this invention is to provide for a wheel structure a multi-part cover assembly in which all of the parts thereof are retained upon the wheel structure by the attachment of one of the parts thereto, certain of the parts being arranged to conceal the outer side of a tire rim of the wheel structure and appurtenances associated therewith and to constitute in effect a continuation of the side wall of a tire in the wheel structure, this part being resiliently, elastically flexible to afford flexure thereof to render the rear side thereof accessible.

Another object of the invention is to provide for a wheel structure an annular retaining element arranged to constitute the retaining means for one part of a multi-part cover assembly and to be retained to the wheel structure by another part of said assembly, said annular retaining element being constructed to also serve as a cover member to provide ornamentation for the outer side of the wheel structure with which it is associated.

In accordance with the general features of my invention, there is provided herein for a wheel structure, a cover assembly including an outer annular part formed from a suitable sheet material giving it resiliently, elastically flexible characteristics such as synthetic plastic, synthetic rubber or natural rubber or the like, and whereby the cover may be locally, resiliently flexed so as to accommodate lateral expansion of the side wall of the tire against which it is disposed as when a load is impressed upon the wheel structure and so as to afford access to the rear side thereof for servicing appurtenances such as the tire valve stem and wheel balancing weights associated with the tire rim which is concealed thereby. This part of the cover assembly is provided with a cross-sectional configuration of such shape and magnitude that it extends over and covers the outer side of the tire rim of a wheel structure and radially outwardly beyond the edge portion of the tire rim toward the medial plane of the side wall of a tire therein to constitute in effect a continuation of the side wall of the tire and to give the appearance of being a part thereof and extends radially inwardly of the wheel structure to a point radially inwardly of the junction of the tire rim and the body part thereof, into attached engagement with an annular cover member disposed over a portion of the outer surface of the body part of the wheel structure, the latter annular member having a radially inner peripheral edge arranged to be retainingly compressed against the outer surface of the body part of the wheel structure by means of a central cover portion which is provided with means affording a snap-on pry-off engagement with the wheel structure.

Still another object of the invention is to provide for a wheel structure a cover assembly including a part cooperable with the body part of the wheel structure for self-centering the cover assembly as it is applied axially inwardly of the wheel structure and having another part arranged for detachable engagement against the wheel structure to maintain the cover in assembled concentric relationship.

Still another object of the invention is to provide for a resiliently flexible cover member, retaining means arranged to retainingly secure the same to a wheel structure and to flex with the cover member to absorb some of the flexing or bending movements normally imposed on the cover member itself during flexure thereof.

Many other objects and advantages of my invention will become apparent from the following description and accompanying drawings in which:

Figure 1 is a fragmentary cross-sectional view of a wheel structure embodying one form of my invention;

Figure 2 is a side elevation of a wheel structure constructed in accordance with Figure 1;

Figure 3 is a fragmentary cross-sectional view of a wheel structure embodying another form of my invention;

Figure 4 is a fragmentary cross-sectional view of a still further modified form of my invention;

Figure 5 is a fragmentary cross-sectional view of a still further modified form of my invention; and Figure 6 is a fragmentary cross-sectional view of the construction shown in Figure 5, the section of Figure 6 being taken at an angle radially disposed from the section shown in Figure 5.

It will be understood that the modifications shown herein are for illustrative purposes only and may be changed or modified without departing from the spirit and scope of the invention as set forth in the appended claims.

As shown in Figure 1 the reference character 10 designates generally a multi-flange, drop center type tire rim which is connected as by riveting or welding or the like through a base flange 11 to a central body part or spider 12 which includes a central bolt-on flange 13. The drop center rim 10 is further provided with opposite side flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project.

The body part 12 is provided with a radially outer flange 12a which is provided with radially inwardly depressed portions to provide circumferentially spaced apertures between the body part 12 and the tire rim 10 which may be utilized in a manner to be presently explained.

The embodiment of the invention shown in Figure 1 includes a cover assembly comprising an outer annulus 20, a central hub cap simulating circular member 21 and an intermediate retaining-ornamental member 22. The cover part 20, as indicated previously, may be constructed from an elastically, resiliently flexible sheet material such as synthetic plastic, rubber, either natural or synthetic, or some other substance having rubber-like characteristics whereby the cover portion 20 may be flexed locally away from the rim 10 and the side wall of the tire to accommodate lateral expansion of the tire under load bearing conditions or to afford access to the covered portion of the tire rim and the accessories associated therewith.

With the cover portion so constructed it is now feasible to provide a cover with a cross-sectional configuration of such curvature and magnitude that it entirely conceals the outer part of the tire rim and the appurtenances such as a tire valve and wheel weights which are associated therewith. Such a construction is now feasible since the outer portion of the cover part is freely flexible as above described.

As indicated previously and as shown in Figures 1 and 2, the outer peripheral edge of the annulus 20 extends over the edge portion 16 of the tire rim to conceal the junction between the same and the tire. Under certain circumstances it is found that with such a construction the peripheral edge of the annulus tends to abrade and wear the side wall of the tire during use. To the end that this may be avoided the peripheral edge of the annulus may be arranged to be spaced slightly from the side wall of the tire when at rest and when the tire is in normal uncompressed position and furthermore the extreme edge thereof may be turned slightly axially outwardly as at 22a whereby a smooth curved surface is presented toward the side wall of the tire. Thus when the tire expands laterally under loaded condition, as at the bottom portion thereof during use, the side wall of the tire abuts this smooth curved surface whereby abrasion and tearing of the tire is prevented.

With such a cover construction, it will be seen that the cover member 20 instead of presenting a sharp axially inward curve from the outer periphery thereof, presents a gradual curve which gives the effect of a continuation of the side wall of a tire and thus the appearance of being a part thereof whereby, if it is colored white, it gives the appearance of being a white side wall of the tire. Furthermore, the cover member 20, since it extends radially outwardly beyond the edge portion 16 of the tire rim, effectively conceals the junction between the tire rim and the tire as well as the outer portion of the tire rim and the appurtenances associated therewith.

Another advantage of a tire cover so constructed is that when the tire 17 assumes a laterally expanded condition as when a load is impressed thereon, the outer peripheral edge of the cover member 20 flexes locally to follow this expanding movement of the tire and immediately recedes to the position shown in Figure 1 as the tire revolves and assumes its normal cross-sectional configuration when the load is relieved therefrom during rotation.

As shown in Figure 1 the intermediate member 22 is annular in form and is provided at its outer peripheral edge with a substantially axially inwardly extending marginal portion 23 terminating in spaced fingers 24. These fingers are adapted to overlie the radially outer surface of the depressed portions of the flange 12a whereby the member is automatically centered concentrically with respect to the wheel structure when urged substantially axially inwardly thereof with the fingers 24 in registry with the circumferentially spaced apertures between the base flange 11 of the tire rim 10 and the flange 12a of the body part 12.

The inner peripheral edge of the outer annular cover member 20 is arranged to extend substantially axially inwardly so that it may be disposed in an overlying position with respect to the radially outer surface of the flange 23 of the cover member 22. Preferably this assembled relationship of the members 20 and 22 is retained by securing the cover members together by cementing or the like.

The inner peripheral margin of the cover member 22 is so arranged that it overlies a radially inner portion of the outer surface of the body part 12 of the wheel structure and is retained securely in this overlying relationship by engagement of the radially outermost part 25 of the central circular hub cap member 21 when the snap-on flange 26 with its peripheral bead 27 is urged axially inwardly over radially outwardly extending humps 28 formed in the outer surface of the body part 12. Preferably the intermediate body part of the annular cover 22 is transversely undulated to form corrugations 29 whereby it is strengthened and the ornamental effect thereof is augmented.

From the foregoing it will be seen that the entire cover assembly is made up of the cover parts 20, 21 and 22, the cover member 20 being secured to the wheel structure by the member 22 while the latter is in turn secured to the wheel structure by the snap-on pry-off engagement of the central hub cap 21 thereto. With such a construction it will be seen that a minimum of fastening elements are required to secure the entire cover assembly to the wheel structure and yet the entire outer side of the wheel structure is concealed by the cover assembly provided. Furthermore the cover parts 20 and 22, when applied axially inwardly against the wheel structure are automatically self-centered to be disposed in concentric relationship thereto by means of the engagement of the fingers 24 with the radially outer surface of the flange 12a of the body part 12 at the circumferentially spaced apertures in the wheel structure.

As indicated previously, the tire valve 19 and other accessories associated with the wheel rim may be rendered accessible by flexing the cover member 20 axially outwardly from the outer peripheral edge thereof. As will be seen from Figure 1, however, it is also feasible to provide an orifice 20a in the cover member 20 whereby the tire valve stem may be rendered accessible for association with the nozzle of an air hose merely by locally deflecting the same inwardly in the vicinity of the orifice whereby the valve is caused to protrude through the tire cover.

It will be seen from the foregoing that there is provided herein a cover construction which is so arranged that the repeated flexing of the cover member 20 during rotation of the wheel under load bearing condition will not repeatedly impress severe bending stresses at the inner peripheral margin thereof to fatigue and break the same, this being accomplished by providing an attachment for the inner peripheral margin of the cover member 20 which accommodates the curvature thereof and provides for flexing of both the cover member and the means to which it is attached. In this regard it will be understood that axial outward flexing of the outer peripheral edge of the cover member 20 will impress bending strains transversely thereacross these strains being transmitted to the inner peripheral edge thereof, and being likewise transmitted to the flange 23 of the cover part 22 so that the flange 23 also bears some of the bending stresses by virtue of slight outward radial movement thereof with the inner peripheral margin of the cover member.

The intermediate retaining cover member 22 may of course be constructed from any one of a variety of available sheet materials. If this member is constructed from metal, it is desirable that the metal be of such a nature that it will take a highly lustrous polish thus greatly augmenting the ornamentation of the wheel structure. On the other hand, this member may be constructed from material similar to that from which the cover member 20 is constructed under which circumstances a wide variety of hues and colors is available for the desired ornamental effect. It is also to be noted that in the event that the cover part 22 is constructed from one of the aforementioned resiliently flexible materials, the flexure of the flange 23 thereof will be considerably enhanced thus to protect the cover member 20, particularly at the inner peripheral margin thereof from severe fatiguing and breaking strain imposed thereon during the flexure thereof.

In the construction shown in Figure 3 the cover member 30 is transversely shaped similarly to the cover member 20 shown in Figure 1. Likewise the central circular hub cap portion 32 is provided with a snap-on flange 33 having a peripheral bead 34 which is adapted to be snapped over radially inwardly extending humps 35 formed in the outer surface of the body part 12 of the wheel structure.

In this construction there is provided an intermediate retaining-ornamental annular member 31 which, as in Figure 1 is provided with a radially inner peripheral edge adapted for sandwiched engagement between the radially outer extremity 36 of the central circular member 32 and the outer surface of the body part 12 of the wheel structure. The outer peripheral margin of the cover member 31 is cross-sectionally configurated to provide a substantially radially outwardly extending fold 37 which affords a bead or rib against which the radially outwardly curled edge 38 of the cover member 20 may rest thus to be retained in its assembled position. The radially outer margin of the cover member 31 is further configurated to provide a reinforcing, ornamental bead 39 which, if desired, may terminate in a peripheral fold-back 40 against which a radially outer portion of the outer surface of the cover member 30 may rest. As will be seen from Figure 3, the intermediate body part of the retaining annulus 31 may be cross-sectionally shaped to conform to the configuration of the adjacent portion of the outer surface of the body part 12 of the wheel structure and thus may rest against the same to be reinforced thereby. Furthermore, if desired, the body portion 12 of the wheel structure may be colored to blend with the color scheme of the vehicle to which it is attached thus enabling the intermediate part of the cover member 31 to be formed from a transparent material whereby the color effect of the spider or body part 12 is preserved and yet is visible from the outside of the wheel structure.

As is the case, in the construction of Figure 1, the intermediate cover member 31 may be constructed from any one of a variety of sheet materials. In the event that this sheet material provides the aforementioned resiliently flexible characteristics, it will be seen that the beaded outer periphery 39 thereof will flex with the repeated flexure of the cover member 31 during rotation of the wheel and will thus absorb much of the stress imposed upon the radially inner peripheral portion thereof.

In the construction of Figure 4 the cover assembly is generally similar to that in the forms previously described; there being an outer resiliently flexible cover portion 41 provided with an orifice 41a through which the tire valve stem 19 may be rendered accessible and having an inner peripheral edge available for attaching relationship with means for securing it to the wheel structure. The cover assembly additionally includes an intermediate annular ornamental-retaining member 42 and a central circular hub cap simulating cover portion 43, the latter being provided with a snap-on flange 44 having a radially inwardly turned peripheral bead 45 for snap-on engagement over resiliently, radially inwardly flexible retaining clips 46 secured to the bolt-on flange 13 of the wheel structure by rivets 47 or by any other suitable means.

In this construction the intermediate annular portion 42 is so arranged that the inner peripheral margin thereof may be disposed in surface engagement with the outer surface of that portion of the body part 12 of the wheel structure which constitutes the curved junction 48 between the radially outer portion of the body part 12 and the bolt or flange 13.

The intermediate annular member 42 is configurated to provide a substantially obliquely extending radially outwardly, axially outwardly, disposed bead 49 terminating in a radially outwardly curled peripheral portion 50 which affords a groove into which the radially inner edge of the cover member 41 may be disposed in attaching engagement. In this construction the self-centering of the cover parts 41 and 42 is accomplished by means of the co-engagement of the inner peripheral curved portion of the cover member 42 with the curved portion 48 of the body part 12 of the wheel structure. After the foregoing cover parts have been applied axially inwardly over the wheel structure, it will be seen that the cover member 43 is applied thereto to retain the entire cover assembly on the wheel structure by axial inward movement thereof whereby the bead 45 overrides the radially outwardly extending hump 51 on the clips 46 thereby bringing the radially outermost extremity 52 over the cover member 43 into pressure engagement toward the body part 12 with the inner peripheral margin of the cover member 42 sandwiched therebetween.

When the cover member 41 of the construction of Figure 4 is flexed outwardly as by lateral expansion of the tire or for obtaining access to the rear surface thereof, it will be understood that in the event that the cover member 42 is constructed from a resiliently flexible material such as a synthetic plastic or rubber, the latter member will flex about the bead 49 thus to absorb some of the bending stresses which would normally be imposed upon the cover member 41 and thus fatigue and break the same.

In the construction disclosed in Figures 5 and 6 the cover assembly is similar to those shown in Figures 1 to 4 and this construction differs therefrom principally in the manner of the connection between the outer annular cover portion 53 and the intermediate, ornamental retaining cover part 54. In this construction, as in those previously described the outer peripheral edge of the cover portion 53 may extend radially outwardly beyond the edge portion 16 of the tire rim thus to conceal the junction between the tire and the rim while the radially inner peripheral portion of the cover member 54 may extend radially inwardly sufficiently far so that it is held in sandwiched relationship between the outer surface of the body part 12 of the wheel structure and the radially outermost extremity 55 of the central hub cap member 56. Here also the hub cap member 56 is provided with a substantially axially inwardly extending snap-on flange 57 terminating in an outwardly curled peripheral bead 58 which is arranged for snap-on engagement over humps 59 extending radially inwardly from the surface of the body part 12 of the wheel structure.

The construction of Figure 5, as the construction of Figure 1, is arranged to cooperate with the circumferentially spaced apertures between the radially inner surface of the base flange 11 of the tire rim 10 and the radially outer surface of the flange 12a of the body part 12 to afford the aforementioned self-centering action for the cover parts 53 and 54. In this construction the cover part 54 is provided at the radially outer peripheral edge thereof with substantially axially inwardly extending fingers 60 which may be bent radially outwardly at their terminal parts as shown at 61. The fingers 60 extend from a substantially axially disposed flange 62 on the cover part 54, this flange 62 being adapted to receive a similar flange 63 of the cover member 53 in surface engagement. As will be seen from Figure 5 the flange 63 of the cover member 53 is provided at its peripheral edge with obliquely disposed radially inwardly, axially outwardly extending fingers 64 which are adapted to interlock with the edge of the flange 62 of the cover member 54 when registered with the spaces between the fingers 60 thereof. Thus there is provided a secure interlocking engagement between the cover members 63 and 54, the cover member 54 being in turn securely retained upon the wheel structure by engagement of the portion 55 of the central hub cap 56 when the latter is secured to the wheel structure in snap-on pry-off relationship by means of the bead 58 and humps 59.

In this construction, as in those previously described, the outer peripheral edge of the cover portion 53 may be provided with an outwardly extending flange 22a to present a spaced curved surface opposite the side wall of the tire. Also, as in the construction shown in Figures 1 to 4, the outer peripheral marginal portion of the intermediate cover 54, if the latter is constructed of a sufficiently resilient material, will be flexed as by radial outward movement of the flange 63 and fingers 60 when the cover member 53 is flexed substantially axially outwardly by manipulation of the edge 22 thereof or under the influence of lateral expansion of the tire under load bearing condition.

In Figure 6 the manner of the engagement of the fingers 64 with the flange 62 of the cover part 54 will be clearly seen. This section is taken on a plane extending through the space between the fingers 60 of the cover member 54 and it will be seen that the fingers or lips 64 are formed to encompass the peripheral edge of the flange 62 of the cover member 54 and so as to be disposed in supporting surface engagement with the adjacent portion of the outer surface of the body part 12 of the wheel structure.

Another important aspect of my invention attending the utilization of an intermediate ornamental retaining annulus, as a part of the wheel cover assembly of the type shown herein, is that the disposal of the inner peripheral margin thereof between the central hub cap member and the adjacent portion of the outer surface of the body part 12 of the wheel structure provides in effect a resilient cushion or gasket which effectively serves to prevent the development of vibratory action between the parts and the resulting rattling thereof, this cushion serving also as a take-up member to prevent the development of play between the parts which results when the otherwise adjacent parts take a set in their assembled relationship.

From the foregoing it will be seen that there is provided herein a cover assembly including a part extending over the outer side of the side wall of a tire in the wheel structure and thus being subjected to repeated and rapid axially outward flexure during rotation of the wheel, and a part for securing the same to the wheel structure which may be constructed with a degree of resiliency sufficient to permit it to absorb some of the flexing movement of the first named member thereby to relieve the latter, this absorption of the flexing movement being accomplished by radial outward movement of the self-centering fingers in the constructions of Figures 1 and 5 and radial inward movement of the beaded portions in the constructions of Figures 3 and 4.

What I claim is:

1. In a wheel structure including a wheel having a tire rim and a body part with a depressed central portion provided with cover retaining means, a wheel cover retaining annulus extending substantially radially along the body part and having an inner margin engaging the body part adjacent to said retaining means, a member engaging said cover retaining means and clamping said inner margin of said retaining annulus to the body part, said retaining annulus having an outer flexible marginal portion extending in a generally axial direction away from said body part and defining a generally radially outwardly facing cover seat, and an annular wheel cover of resiliently deflectable material disposed over the outer side of the tire rim and having a radially and axially inwardly extending inner margin disposed in face-to-face abutment with said seat and retained thereby on the wheel.

2. In a wheel structure including a tire rim and a body part constructed and related to provide circumferentially spaced openings therebetween, a cover retaining annulus extending substantially radially outwardly from engagement with a central portion of the body part and diverging in an axially outward direction from the body part to lie in spaced relation to the body part and having a flexible outer margin turned axially inwardly from the spaced portion thereof toward engagement with the body part at the radially inner side of said wheel openings, said flexible margin having axially inwardly extending fingers engaging the body part within said openings for maintaining the retaining annulus in substantially coaxial relation to the wheel but being freely movable radially outwardly away from the body part upon flexure of said turned margin, and an annular wheel cover of resiliently deflectable material disposed over the outer side of the tire rim and having a radially and axially inwardly extending inner margin secured in face-to-face abutment to said turned margin of the retaining annulus serving as a seat therefor.

GEORGE ALBERT LYON.